United States Patent [19]

Adams

[11] E Re. 29,738

[45] Reissued Aug. 22, 1978

[54] APPARATUS FOR PROVIDING ENERGY COMMUNICATION BETWEEN A MOVING AND A STATIONARY TERMINAL

[76] Inventor: Dale A. Adams, Rte. 8, Box 316-0, Tucson, Ariz. 85730

[21] Appl. No.: 827,117

[22] Filed: Aug. 23, 1977

Related U.S. Patent Documents

Reissue of:

[64] Patent No.: 3,586,413
Issued: Jun. 22, 1971
Appl. No.: 810,310
Filed: Mar. 25, 1969

[51] Int. Cl.[2] ..... G02B 17/00; H01R 39/00

[52] U.S. Cl. ..... 350/6.5; 350/23; 174/86; 64/2 R; 339/5 R

[58] Field of Search ..... 350/7, 23; 174/86; 64/2 R; 339/5 R; 191/12 R

[56] References Cited

U.S. PATENT DOCUMENTS

| | | | |
|---|---|---|---|
| 959,013 | 5/1910 | Howell | 350/7 |
| 2,147,615 | 2/1939 | Baroni | 350/23 |
| 2,481,196 | 9/1949 | Bulliet | 324/163 |
| 2,966,096 | 12/1960 | D'Incerti et al. | 350/23 |
| 3,358,072 | 12/1967 | Wrench | 174/86 |
| 3,428,812 | 2/1969 | Burke | 350/23 |

*Primary Examiner*—Jon W. Henry
*Attorney, Agent, or Firm*—Henry W. Collins; George H. Gerstman; Paul C. Flattery

[57] ABSTRACT

A rotating platform is supported above a stationary surface by means of a rotating support. The platform and support are driven about their respective axes in the same relative direction at speeds in the ration of two-to-one respectively. A terminal is located on the stationary surface is communication with a second terminal positioned on the rotating platform. An energy-guiding channel such as an electrical conductor is connected between the first and second terminals and is positioned to extend closer to the axis of said rotating support than the rotating support and subsequently up to the rotating platform, around the platform, onto the surface to which the second terminal is connected. The surface of the rotating platform upon which the second terminal is located is positioned remote or away from the stationary surface so that the electrical conductor is forced to follow a path around the outer edge of the platform down to the stationary surface.

7 Claims, 15 Drawing Figures

FIG. 4
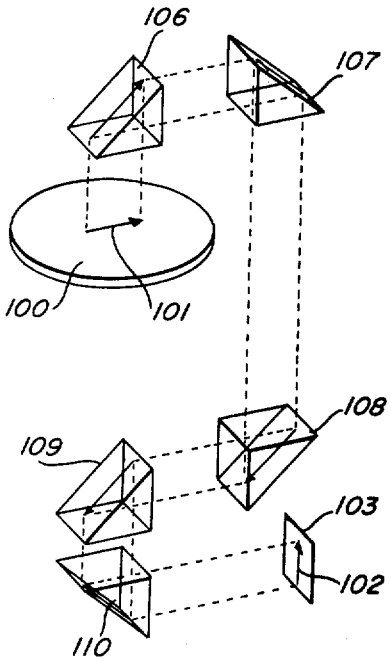
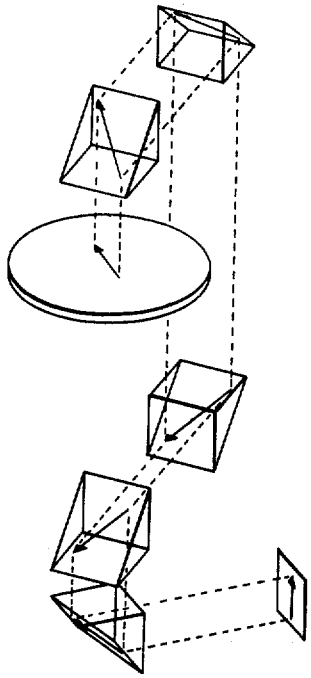
FIG. 5
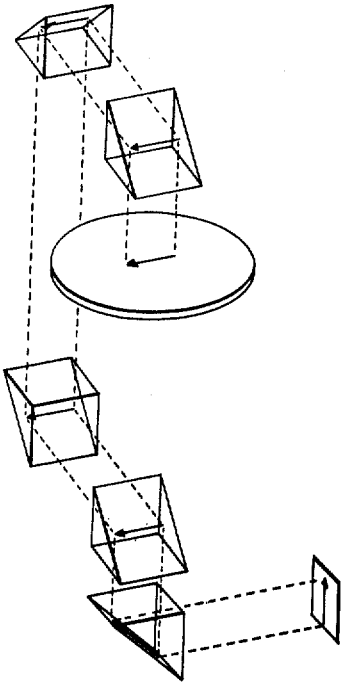
FIG. 6
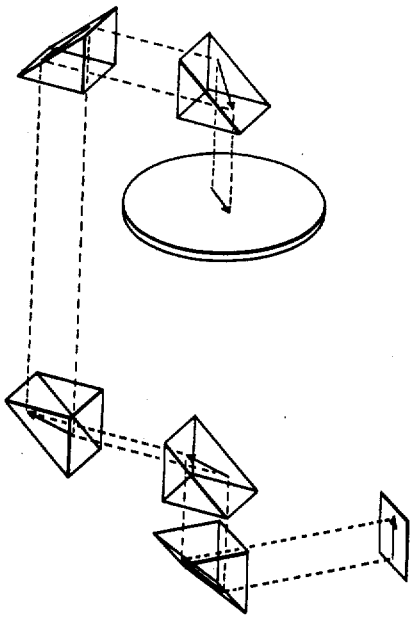
FIG. 7

APPARATUS FOR PROVIDING ENERGY COMMUNICATION BETWEEN A MOVING AND A STATIONARY TERMINAL

Matter enclosed in heavy brackets [ ] appears in the original patent but forms no part of this reissue specification; matter printed in italics indicates the additions made by reissue.

The present invention pertains to apparatus for facilitating energy communication between terminals; more specifically, the present invention pertains to a means for facilitating such communication between a stationary and a moving member.

There are numerous instances in modern technology requiring the communication between terminals, one of which is moving and the second of which is stationary. For example, to provide electromagnetic communication such as an electrical current between the two terminals, the problem of relative motion between the terminals must be accounted for. If the motion of the moving terminal is, for example, rotary, then the electrical conductor connecting the terminals will either become twisted or will wrap around the supporting shaft about which the moving terminal rotates or revolves. The obvious expedient to avoid such problems is the utilization of slip rings which permit relative motion between terminals while maintaining electrical contact therebetween.

In numerous applications, the utilization of slip rings is unsatisfactory but is the only prior art alternative. For example, in applications wherein the signal current being transmitted is relatively low level, the variations of contact resistance resulting from the constantly changing resistance of slip rings imposes substantial limitations on the transmitted signal. If the transmitted signal represents information, the signal level must be maintained sufficiently high to overcome the interfering effects of slip ring noise. When the electromagnetic communication approaches or is in the optical range of frequencies, there is no convenient prior art method for providing communication without substantial interference. For example, if it were desired to read the face of a meter that was revolving or rotating, aside from the utilization of stroboscopic techniques, there would be no way to visually observe the meter reading. Even with the use of stroboscopic techniques, the observance would be intermittent and not continuous.

When the energy being communicated between terminals is in the form of fluid, such as gas or liquid, the same problems exist in that slip couplings give rise to the requirement of seals which are continually experiencing relative motion with an adjacent sealing surface.

It is therefore an object of the present invention to provide apparatus for energy communication between a moving and a stationary terminal.

It is a further object of the present invention to provide apparatus for energy communication between a moving and a stationary terminal without the utilization of slip rings, seals, or stroboscopic techniques.

It is also an object of the present invention to provide apparatus for energy communication between a moving and a stationary terminal wherein the energy is in one of several forms of energy communication, such as pneumatic, hydraulic, optical electromagnetic, and acoustic flow.

It is another object of the present invention to provide electromagnetic communication between a terminal mounted on a rotating platform and a terminal on a stationary platform.

It is still another object of the present invention to provide apparatus for permitting the connection of an electrical conductor to one terminal on a rotating platform and connection to a second terminal on a stationary surface without twisting or wrapping the conductor.

These and other objects of the present invention will become apparent to those skilled in the art as the description thereof proceeds.

Briefly, in accordance with the embodiment chosen for illustration, a rotating support is mounted on a stationary surface for rotation about an axis. An electrical conductor is connected to a terminal on the stationary surface and passes from the stationary surface through the rotating support such that the conductor is closer to the axis of rotation of the rotating support than the rotating support. That is, at least at the intersection of the rotating support and the stationary surface, the rotating support must be hollow to permit the passage of the electrical conductor.

A rotating platform is mounted on the rotating support to permit relative rotation between the two. The platform includes a surface positioned away from or remote to the stationary surface. This remote surface may be utilized to support electrical equipment including a second terminal to which electrical connection is to be made. The electrical conductor is extended from its position closer to the axis of rotation of the rotating support around the edge of the rotating platform to the remote surface thereof; subsequently, the conductor is connected to the second terminal. An electric motor is geared to rotate the rotating support and a gear arrangement is provided to drive the rotating platform in the same direction but at twice the angular velocity of the rotating support. The above arrangement permits the electrical conductor to carry current between the first and second terminals, even though one terminal is stationary and the second terminal is in motion.

This invention may more readily be described by reference to the accompanying drawings, in which:

FIGS. 4–7 are successive schematic views of a system constructed in accordance with the teachings of the present invention, utilizing an optical signal-guiding channel.

The first embodiment herein described is chosen as an electromagnetic embodiment since the difficulties inherent in energy communication between terminals is most readily understood with this particular embodiment. The specific problems involved in providing an electrical current between a stationary and a moving terminal demonstrate the common problem of energy communication in other systems, such as hydraulic systems, optical systems, etc.

Figure 1:
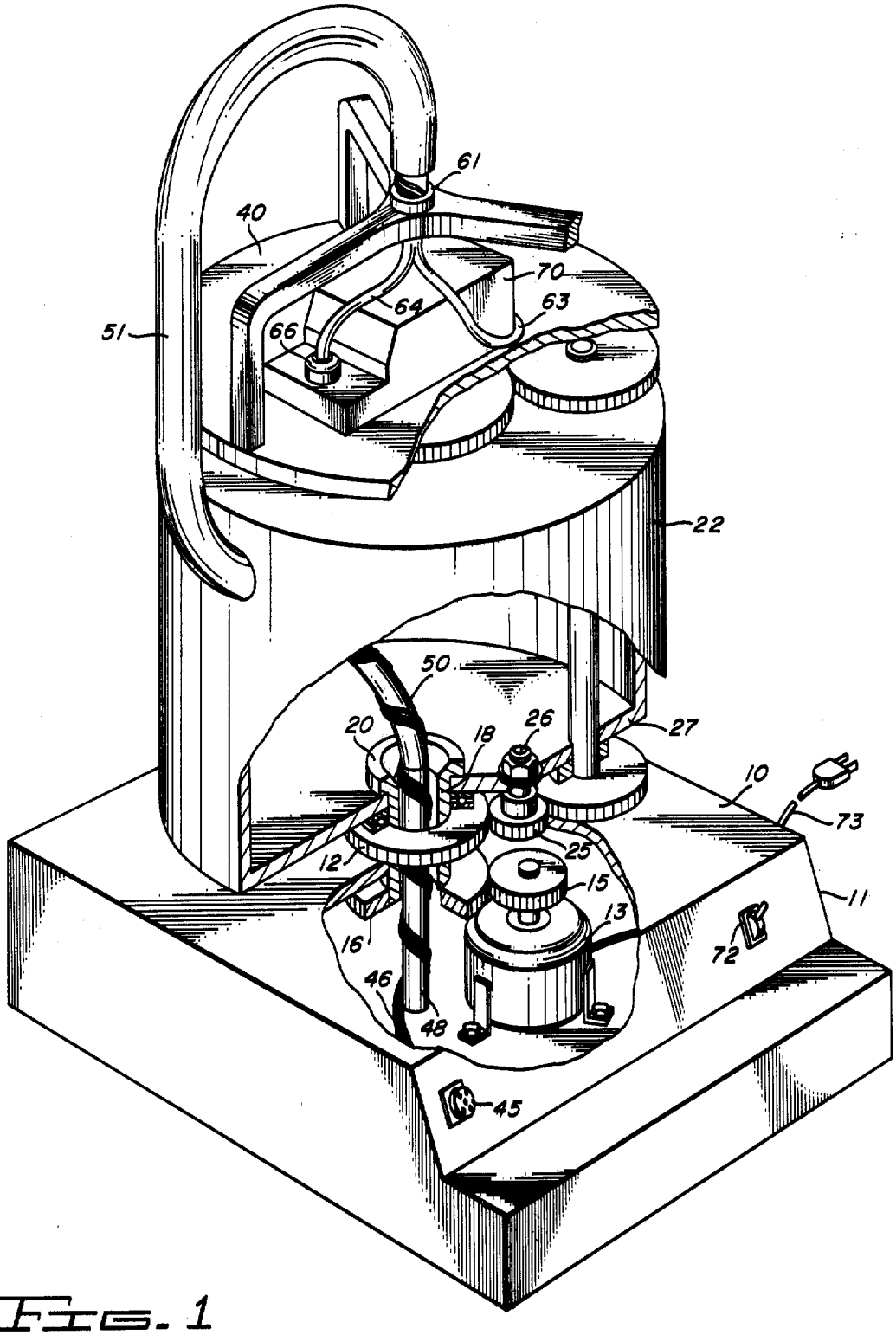
FIG. 1 is a perspective view, partially broken away, of the apparatus constructed in accordance with the teachings of the present invention.
Figure 2:
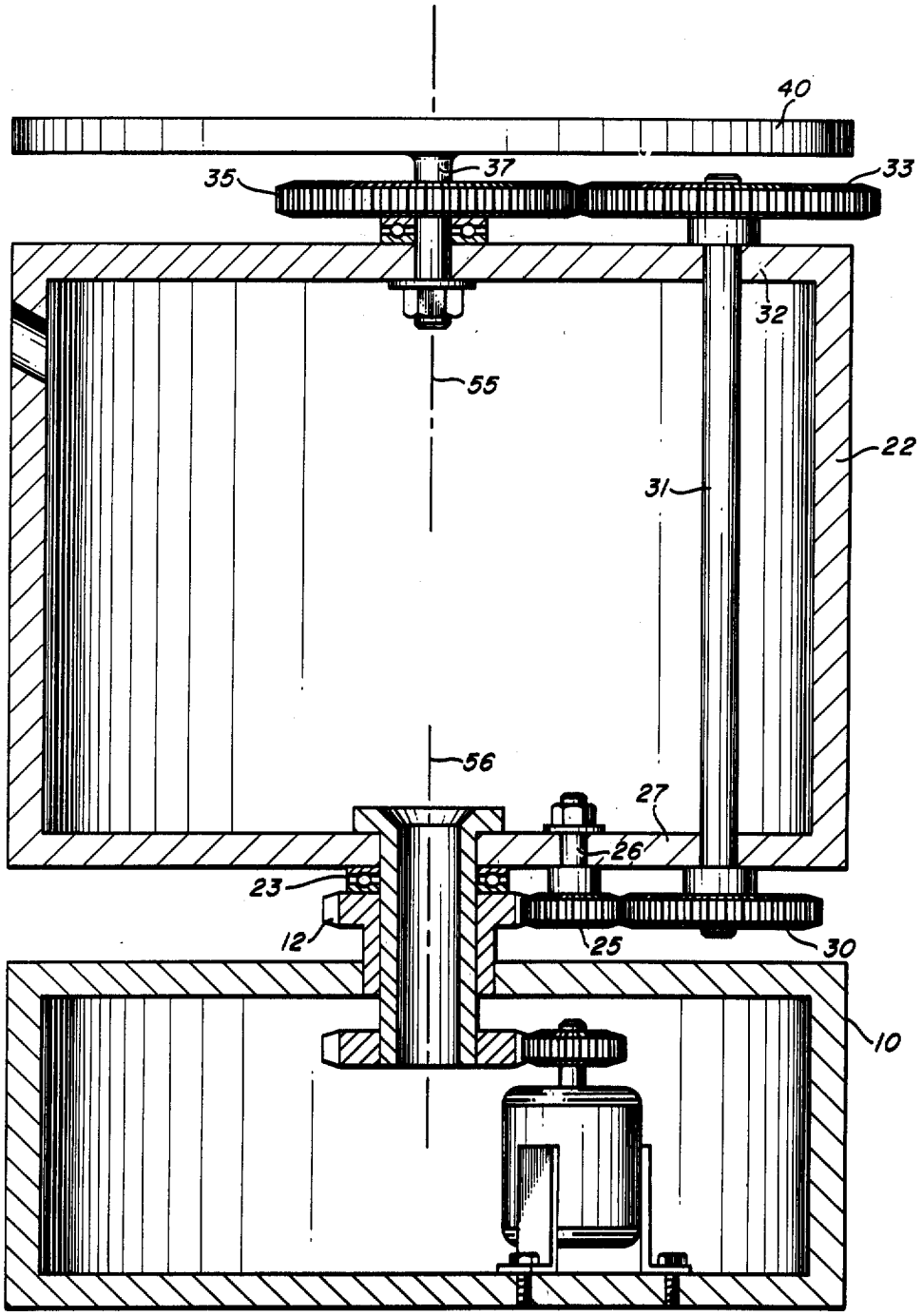
FIG. 2 is a cross-sectional view of a portion of FIG. 1.

Referring to FIGS. 1 and 2, the embodiment chosen for illustration represents a device that may be used to provide electrical connection between a stationary terminal and an electrical device mounted on a rotating platform. Such devices may be constructed for such applications as centrifuges wherein electrical equipment and components are being subjected to g forces while electrical measurements are being made. A stationary surface 10 forming part of a mounting base 11 is provided with a stationary gear 12 which may be secured to the surface 10 such as by welding. The base 11 includes an electric motor 13 therein having a drive gear 15 secured thereto in driving engagement with a ring gear 16. The ring gear 16 is attached to a cylindrical member 18 which extends through the stationary surface 10 and ring gear 12 and is provided with a flange 20 welded or otherwise secured to a rotating support 22. The rotating support 22 may be separated from the stationary surface 10 and ring gear 12 by a bearing 23. It may thus be seen that energization of the electric motor 13 results in the rotation of the rotating support 22 through the expediency of the drive gear 15 and ring gear 16.

The rotating support 22 supports an idler gear 25 mounted on a shaft 26 journaled in the bottom wall 27 of the rotating support 22. The idler gear 25 is in driving engagement with the ring gear 12 and will therefore rotate as it revolves about the ring gear 12. A lower transfer gear 30 is in driving engagement with the idler gear 25 and is mounted on a transfer shaft 31 journaled in the lower wall 27 and the upper wall 32 of the rotating support 22. The opposite end of the transfer shaft 31 is connected to an upper transfer gear 33 which is positioned in driving engagement with a platform drive gear 35. The platform drive gear 35 is mounted on a shaft 37 journaled in the top wall 32 of the rotating support 22; the shaft 37 extends above the platform drive gear and acts as a support for a rotating platform 40. The gear ratios of the fixed ring gear 12, idler gear 25, transfer gears 30 and 33, and the platform drive gear 35 are chosen to provide a relative rotational velocities of the rotating platform 40 and the rotating support 22 of two-to-one.

A terminal block 45 may conveniently be connected to the front face of the base 11 to provide a convenient means for connection to a multiconductor cable 46. The cable, solely for purposes of guiding the cable and preventing it from becoming entangled, is wrapped around a post 48 extending upwardly from within the base 11 through the cylinder 18. A flexible conductor guide 50 is connected to the post 48 to provide a means for supporting the cable 46 as the cable extends upwardly from the base 11. The conductor guide 50 may be formed of a variety of materials such as plastic or rubber or even flexible metal which can readily be flexed and act as a guide or flexible core for the cable 46. It is important to note at this point that the conductor guide 50 is not necessary and that the cable 46 may be extended from the base upwardly as shown in FIG. 1 without the utilization of conductor guide 50; however, it has been found helpful to provide a more orderly configuration by utilizing a guide such as the conductor guide 50. Further, by using a conductor guide, the cable 46 is subjected to less bending stress. It is also important to note that neither the cable 46 nor the conductor guide 50 is subjected to torque or twisting force.

In the embodiment chosen for illustration, the rotating support 22 is shown in drum form having a cylindrical outer wall. In the latter form, it has been found useful to provide a tubular channel 51 to receive the conductor guide 50 with the cable 46 wrapped therearound. The tubular channel 51 extends from the outer surface of the drum-shaped rotating support 22 to a position immediately above and coaxial with the rotating platform 40.

The rotating platform 40 is mounted for rotation about an axis 55 while the rotating support 22 is mounted for rotation about an axis 56. In the embodiment chosen for illustration, the axes 55 and 56 are coincidental, although coincidence is not necessary for the operation of the system of the present invention. A spider member 61 is secured to the platform 40 and is provided with an opening for the sole purpose of guiding the cable 46 and conductor guide 50 as it emerges from the tubular channel 51. The cable 46 may subsequently be divided into separate cables 63 and 64, each connected to different connectors such as the one shown at 66 which ultimately "plugs" to an electrical device 70 mounted on the platform 40. Electrical connection is thus established between the terminal block 45 and the connector 66. This electrical connection can be maintained even though the rotating platform 40 is rotated. The motion is started by energizing the electric motor 13 through the on/off switch 72 which applies electrical current from an external source through conductors 73 to the motor. The rotating support 22 is thus rotated at a given velocity and the rotating platform 40 is driven at a velocity equal to twice the velocity of the rotating support through the expediency of the previously described gear arrangement.

Figure 3:
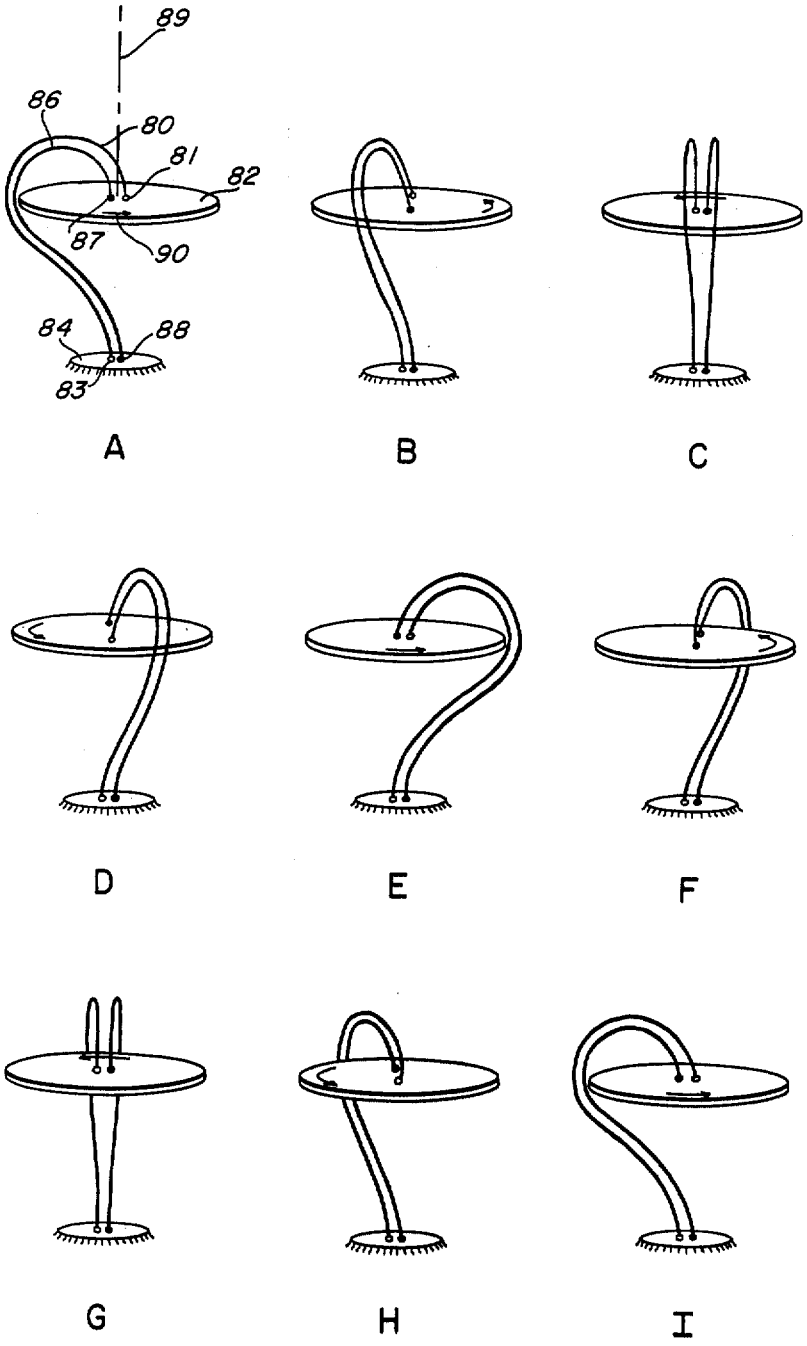
FIGS. 3A–3I are schematic diagrams of a rotating platform showing successive positions of electrical conductors connected thereto useful for explaining the concept of the present invention.

The above description relates to the electromagnetic energy system. The electrical current travels from a stationary to a moving terminal. A more thorough understanding of the concept may be achieved by an examination of the electromagnetic system and then an investigation of the same inventive concept as it applies to other energy systems. An explanation of the phenomena describing the operation of the apparatus of FIGS. 1 and 2 may be facilitated by reference to the schematic illustrations of FIG. 3. In FIG. 3, a first conductor 80 is shown connected between a white terminal 81 on a rotating platform 82 and a similar white terminal 83 on a stationary surface 84. A second electrical conductor 86 is connected between a black terminal 87 on the rotating platform 82 and a black terminal 88 on the stationary surface 84. In FIG. 3A, the arrow 90 indicates the direction of rotation of the platform 82 and the relative positions of the white terminal 81 and black terminal 87 of the orientation of the terminals on the platform to the corresponding terminals on the stationary surface 84. In FIG. 3B, it may be seen that the platform 82 has rotated 90°, similarly, in FIG. 3C, the platform 82 has completed 180°. A comparison of FIGS. 3A and 3C will illustrate that the terminals 81 and 87 on the platform have now changed as seen by the viewer while the platform has rotated 180° and the conductors 80 and 86 have rotated 90° about the axis of rotation 89. FIGS. 3D and 3E demonstrate continued rotation of the platform 82 such that in FIG. 3E it may be seen that the platform 82 has completed 360° rotation; however, while the terminals 81 and 87 are again in the relative positions as seen by the viewer in FIG. 3A, the conductors 80 and 86 have completed only 180° of rotation about the abix 89. An inspection of FIGS. 3F, 3G, 3H, and 3I will show that continued rotation of the platform 82 for an additional 360° will result in the return of all the elements to the positions shown in FIG. 3A. Thus, for every 720° rotation of the platform 82, the conductors 80 and 86 will complete 360° of rotation without becoming twisted. The conductors are subjected to a flexure or continuous bending as they travel about the axis 89 but are not rotated or twisted about their own axis.

The present invention may also be described, for purposes of understanding the concept, in terms of its applicability to an optical system. It may be understood that while optical systems are concerned with visible wave lengths, we are still concerned with electromagnetic radiation (although of a much higher frequency than heretofore discusses). Even though both the electromagnetic embodiments and the optical embodiments are concerned with electromagnetic energy, the embodiments for practicing the invention will take substantially different forms in view of the behavioral characteristics of the energy in transit. FIGS. 4–7 schematically illustrate the utilization of apparatus constructed in accordance with the teachings of this invention for use with optical frequencies. In FIG. 4, a rotating platform 100 is shown having an object 101 mounted thereon which is to continuously be observed while it is being rotated with the platform 100. To facilitate this continuous observation, a stationary and continuous image 102 may be formed on a stationary surface 103 simply by providing an optical transmission path having light receiving and redirecting means such as prisms 106–110 positioned in a manner equivalent to the electrical conductors of FIGS. 1–3.

FIG. 5 illustrates the apparatus of FIG. 4 after the platform 100 has been rotated 90°. It may be seen from this schematic illustration that the image 102 formed on the stationary surface 103 remains in an identical orientation to the image previously formed in FIG. 4. Similarly, FIGS. 6 and 7 demonstrate the generation of an image 102 on the stationary surface 103 even though the object 101 has been rotated with the platform 100 through 180° and 270° respectively.

While the present invention has been described in terms of specific embodiments utilizing electrical conductors and detailed elements such as FIGS. 1 and 2, and while an optical embodiment of the invention has been described with the aid of schematic illustrations in FIGS. 4–7, it will be apparent that the present invention may be practiced with equal facility in other energy systems. For example, it is frequently desirable to deliver liquid or possibly gas under pressure to a moving terminal from a stationary terminal. In those instances, the difficulties discussed previously such as problems with seals, etc. are manifest. The concept of the present invention obviates these difficulties by providing a means to communicate the hydraulic or gaseous energy directly to the moving terminal through an unbroken conduit such as a flexible tube without difficulties inherent in sliding connections. Similarly, in acoustical systems which sometimes may be considered extensions of gas, systems may readily be designed to deliver the pressure wave fronts between a stationary and moving terminal without the necessity of connections, slip fittings, or seals, any of which would give rise to acoustical reflections, thereby degrading the acoustic signal during transit. A mechanical system is also contemplated as an energy transmitting system. For example, the physical motion between two elements mounted at the moving terminal may readily be transmitted via a flexible cable to the stationary terminal to yield, at the stationary terminal, an indication of the relative motion. A mechanical system of this type may conveniently be used as a means for measuring a force being exerted on a yieldable member (e.g., a spring) which responds to the force by a calibratable movement. This movement may be transmitted via the flexible cable, either as a torsional movement of the cable or an axial movement of the cable. The cable movement is transmitted directly from the moving terminal to the stationary terminal to permit measurements of the cable movement at the stationary terminal.

The embodiments described in the accompanying figures may also take the form of a great variety of apparatus designs. For example, as previously mentioned in connection with the description of FIG. 1, the electrical conductor may be connected between a stationary terminal and the moving terminal without the aid of a conductor guide upon which it is wrapped or without the aid of a tubular channel, the latter elements merely facilitated for orderly positioning of the conductors. It will also be apparent that the spider 61 of FIG. 1 is entirely unnecessary for the functioning of the apparatus and is provided only to assist in the positioning of the cable 46 as it emerges from the tubular channel 51. The means utilized to drive the platform may also vary. For example, the present concept is equally implemented by merely driving the rotating support 22 and letting the electrical cable 46 or the conductor guide 50 provide the necessary torque for driving the rotating platform 40. This latter scheme may conveniently be used when the mass of the platform 40 is small and very little torque will be required to provide the rotational force such that the strength of an electrical conductor alone is sufficient. When the electrical conductor is used as the means for driving the rotating platform, the conductor acts as the means for delivering mechanical force as well as a means for transmitting electrical current. Similarly, the rotating platform 40 may directly be driven and the rotating support 22 may be connected thereto to rotate at the required velocity. If the electrical conductor or a conductor guide is to be used as the means for mechanically driving the rotating support or the rotating platform, then the ratio of velocities will automatically be achieved and the necessity for gear trains or other motion transmitting means is eliminated. The embodiments chosen for illustration and modifications thereof coming within the concepts of the present invention seem to require that the electrical conductor or signal guiding channel extend from a stationary surface closer to the axis of rotation of a rotating support than the rotating support. In other words, the rotating support must provide a means for the passage of the electrical conductor extending from a stationary surface to the remote side of a rotating platform. This provision is usually accomplished by making the rotating support hollow at least at the portion thereof adjacent to the stationary surface from which it extends. It will also be obvious that the utilization of the terminology "platform" is not intended to connote an elongated or extensive surface but, rather, is intended as a general term indicating a surface upon which something such as a terminal can be mounted. The rotating platform 40 includes a remote surface positioned away from the stationary surface from which it is supported; however, the term "remote" is intended to mean that surface which directly opposes the electrical conductor or signal-guiding channel as it makes contact with the surface or a device mounted on the surface.

It will therefore be seen that the present concept encompasses a broad range of apparatus employing a common phenomena which permits the connection between a transmitting or receiving stationary terminal to a receiving or transmitting moving terminal by means of a signal-guiding channel which itself does not twist.

[I claim:] *What is claimed is:*

[1. Apparatus for providing energy communication between a moving terminal and a stationary terminal comprising: a rotating platform having an axis of rotation; a rotating support extending from a stationary surface supporting said platform in spaced-apart relation to said stationary surface, said axis of rotation passing through said stationary surface, said rotating support having a second axis of rotation; said rotating platform having a far side facing away from said stationary surface and a near side facing said stationary surface; first means fixedly secured to said far side of said rotating platform for receiving or transmitting energy; second means fixedly secured to said stationary surface for receiving or transmitting energy transmitted or received by said first means; a rotating energy-guiding channel connected between said first and second means; said energy-guiding channel extending from a point substantially at the axis of rotation of said far side of said rotating platform, out around the platform, to a point on said stationary surface which is substantially at the intersection of said axis of rotation of said rotating platform and said stationary surface, the axis of rotation of said energy-guiding channel being coaxial with said axis of rotation of the rotating platform; means for rotating said platform and said energy-guiding channel in the same direction coaxially about the axis of rotation of said rotating platform and relative to each other in the ratio of two-to-one respectively.]

[2. The combination set forth in claim 1, wherein said energy-guiding channel comprises an electrical conductor.]

[3. The combination set forth in claim 1, wherein said energy-guiding channel comprises a light transmission path including light receiving and redirecting elements positioned along said path.]

*4. Apparatus for providing fluid communication between a moving terminal and a stationary terminal comprising: a rotating platform having an axis of rotation; a rotating support extending from a stationary surface supporting said platform in spaced-apart relation to said stationary surface, said axis of rotation passing through said stationary surface, said rotating support having a second axis of rotation; said rotating platform having a far side facing away from said stationary surface and a near side facing said stationary surface; first means fixedly secured to said far side of said rotating platform for receiving or transmitting fluid; second means fixedly secured to said stationary surface for receiving or transmitting fluid transmitted or received by said first means; a rotating, flexible, fluid-carrying channel connected between said first and second means; said fluid-carrying channel extending from a point substantially at the axis of rotation of said far side of said rotating platform, out around the platform, to a point on said stationary surface which is substantially at the intersection of said axis of rotation of said rotating platform and said stationary surface, the axis of rotation of said fluid-carrying channel being coaxial with said axis of rotation of the rotating platform; means for rotating said platform and said fluid-carrying channel in the same direction coaxially about the axis of rotation of said rotating platform and relative to each other in the ratio of 2:1, respectively.*

*5. Apparatus as set forth in claim 4, wherein the axis of rotation of said rotating platform is substantially the same as the axis of rotation of said rotating support.*

*6. Apparatus as described in claim 4, wherein said fluid-carrying channel comprises an elongated flexible tube, extending continuously from said first means to said second means.*

*7. Apparatus for providing light transmission between a moving terminal and a stationary terminal comprising: a rotating platform having an axis of rotation; a rotating support extending from a stationary surface supporting said platform in spaced-apart relation to said stationary surface, said rotating support having a second axis of rotation; said rotating platform having a far side facing away from said stationary surface and a near side facing said stationary surface; first means fixedly secured to said far side of said rotating platform for receiving or transmitting light; second means fixedly secured to said stationary surface for receiving or transmitting light transmitted or received by said first means; a rotating light transmission path, including light receiving and redirecting elements positioned along the path and connected between said first and second means; said light transmission path extending from a point substantially at the axis of rotation of said far side of said rotating platform, out around the platform, to a point on said stationary surface which is substantially at the intersection of said axis of rotation of said rotating platform and said stationary surface, the axis of rotation of said light transmission path being coaxial with said axis of rotation of the rotating platform; means for rotating said platform and said light transmission path in the same direction coaxially about the axis of rotation of said rotating platform and relative to each other in the ratio of 2:1, respectively; whereby for every 720° rotation of the platform the light transmission path will rotate 360°.*

*8. Apparatus as set forth in claim 7, wherein the axis of rotation of said rotating platform is substantially the same as the axis of rotation of said rotating support.*

*9. Apparatus for providing mechanical energy communication between a moving terminal and a stationary terminal comprising: a rotating platform having an axis of rotation; a rotating support extending from a stationary surface supporting said platform in spaced-apart relation to said stationary surface, said axis of rotation passing through said stationary surface, said rotating support having a second axis of rotation; said rotating platform having a far side facing away from said stationary surface and a near side facing said stationary surface; first means fixedly secured to said far side of said rotating platform for receiving or transmitting mechanical energy; second means fixedly secured to said stationary surface for receiving or transmitting energy transmitted or received by said first means; a rotating flexible cable connected between said first and second means; said flexible cable extending from a point substantially at the axis of rotation of said far side of said rotating platform, out around the platform, to a point on said stationary surface which is substantially at the intersection of said axis of rotation of said rotating platform and said stationary surface, the axis of rotation of said flexible cable being coaxial with said axis of rotation of the rotating platform; means for rotating said platform and said flexible cable in the same direction coaxially about the axis of rotation of said rotating platform and relative to each other in the ratio of 2:1, respectively.*

*10. Apparatus as set forth in claim 9, wherein the axis of rotation of said rotating platform is substantially the same as the axis of rotation of said rotating support.*

* * * * *